United States Patent [19]
Pike et al.

[11] Patent Number: 6,090,731
[45] Date of Patent: Jul. 18, 2000

[54] HIGH DENSITY NONWOVEN FILTER MEDIA

[75] Inventors: Richard Daniel Pike, Norcross, Ga.; Kurtis Lee Brown, Appleton, Wis.; Peter Wyndham Shipp, Jr., Woodstock, Ga.

[73] Assignee: Kimberly-Clark Worldwide, Inc., Neenah, Wis.

[21] Appl. No.: 09/129,353

[22] Filed: Aug. 5, 1998

Related U.S. Application Data

[62] Division of application No. 08/880,063, Jun. 20, 1997, Pat. No. 5,855,784, which is a continuation of application No. 08/425,539, Apr. 20, 1995, abandoned, which is a continuation-in-part of application No. 08/332,292, Oct. 31, 1994, abandoned.

[51] Int. Cl.$^7$ .............................. D04H 1/54; B32B 27/12
[52] U.S. Cl. .................... 442/409; 442/340; 442/351; 442/361; 442/382; 442/411
[58] Field of Search .................................. 442/340, 350, 442/351, 361, 400, 401, 382

[56] References Cited

U.S. PATENT DOCUMENTS

| | | | |
|---|---|---|---|
| 3,399,259 | 8/1968 | Brayford . | |
| 3,423,266 | 1/1969 | Davies et al. . | |
| 3,595,731 | 7/1971 | Davies et al. . | |
| 3,692,618 | 9/1972 | Dorschner et al. | 161/72 |
| 3,780,149 | 12/1973 | Keuchel | 264/168 |
| 3,802,817 | 4/1974 | Matsuki et al. | 425/66 |
| 3,849,241 | 11/1974 | Butin et al. | 161/169 |
| 4,068,036 | 1/1978 | Stanistreet | 428/296 |
| 4,178,157 | 12/1979 | van Turnhout et al. | 55/155 |
| 4,189,338 | 2/1980 | Ejima et al. | 156/167 |
| 4,211,661 | 7/1980 | Perry | 210/491 |
| 4,215,682 | 8/1980 | Kubik et al. | 128/205 |
| 4,269,888 | 5/1981 | Ejima et al. | 428/296 |
| 4,280,860 | 7/1981 | Shen et al. | 156/167 |
| 4,315,881 | 2/1982 | Nakajima et al. | 264/171 |
| 4,340,563 | 7/1982 | Appel et al. | 264/518 |
| 4,375,718 | 3/1983 | Wadsworth et al. | 29/592 |
| 4,414,276 | 11/1983 | Kiriyama et al. | 428/374 |
| 4,469,540 | 9/1984 | Furukawa et al. | 156/62.4 |
| 4,508,113 | 4/1985 | Malaney | 128/132 |
| 4,548,628 | 10/1985 | Miyake et al. | 55/487 |
| 4,551,378 | 11/1985 | Carey, Jr. | 428/198 |
| 4,589,894 | 5/1986 | Gin et al. | 55/274 |
| 4,592,815 | 6/1986 | Nakao | 204/165 |
| 4,657,804 | 4/1987 | Mays et al. | 428/212 |
| 4,663,220 | 5/1987 | Wisneski et al. | 428/221 |
| 4,749,348 | 6/1988 | Klaase et al. | 425/174.8 |
| 4,774,124 | 9/1988 | Shimalla et al. | 428/171 |
| 4,814,032 | 3/1989 | Taniguchi et al. | 156/167 |
| 4,818,587 | 4/1989 | Ejima et al. | 428/198 |
| 4,830,904 | 5/1989 | Gessner et al. | 428/219 |
| 4,839,228 | 6/1989 | Jezic et al. | 428/401 |
| 4,842,739 | 6/1989 | Tang | 210/489 |
| 4,874,666 | 10/1989 | Kubo et al. | 428/398 |
| 4,883,707 | 11/1989 | Newkirk | 428/219 |
| 4,917,942 | 4/1990 | Winters | 428/286 |
| 4,948,515 | 8/1990 | Okumura et al. | 210/748 |
| 4,973,382 | 11/1990 | Kinn et al. | 162/146 |
| 4,980,215 | 12/1990 | Schonbrun | 428/72 |
| 4,981,749 | 1/1991 | Kubo et al. | 428/219 |
| 5,077,116 | 12/1991 | Lefkowitz | 428/141 |
| 5,082,720 | 1/1992 | Hayes | 428/224 |
| 5,106,552 | 4/1992 | Goi et al. | 264/103 |
| 5,108,820 | 4/1992 | Kaneko et al. | 428/198 |
| 5,130,196 | 7/1992 | Nishio et al. | 428/373 |
| 5,133,917 | 7/1992 | Jezic et al. | 264/210.8 |
| 5,167,765 | 12/1992 | Nielsen et al. | 162/146 |
| 5,198,057 | 3/1993 | Newkirk et al. | 156/83 |
| 5,225,014 | 7/1993 | Ogata et al. | 156/73.2 |
| 5,273,565 | 12/1993 | Milligan et al. | 55/528 |
| 5,401,446 | 3/1995 | Tsai et al. | 265/22 |
| 5,409,766 | 4/1995 | Yuasa et al. | 428/224 |
| 5,415,644 | 5/1995 | Enloe | 604/385.2 |
| 5,418,045 | 5/1995 | Pike et al. | 428/198 |
| 5,482,772 | 1/1996 | Strack et al. | 428/357 |
| 5,597,645 | 1/1997 | Pike et al. | 96/99 |
| 5,609,947 | 3/1997 | Kamei et al. | 428/212 |

FOREIGN PATENT DOCUMENTS

| | | |
|---|---|---|
| 0466381 | 1/1992 | European Pat. Off. . |
| 3824983 | 2/1989 | Germany . |
| 1094420 | 12/1967 | United Kingdom . |
| 89/10989 | 11/1989 | WIPO . |
| 91/14503 | 10/1991 | WIPO . |
| 93/01334 | 1/1993 | WIPO . |
| 95/05501 | 2/1995 | WIPO . |
| 95/13856 | 5/1995 | WIPO . |

*Primary Examiner*—Blaine Copenheaver
*Assistant Examiner*—Ula C. Ruddock

[57] ABSTRACT

The invention provides a sheet filter medium having autogenously bonded uncrimped conjugate fibers which contain a polyolefin and another thermoplastic polymer that have different melting points. The filter medium has a density between about 0.07 g/cm$^3$ and about 0.2 g/cm$^3$. The invention additionally provides a three-dimensionally thermoformed filter medium that has a density between about 0.07 g/cm$^3$ and about 0.5 g/cm$^3$.

29 Claims, 7 Drawing Sheets

HIGH DENSITY NONWOVEN FILTER MEDIA

This application is a divisional of application Ser. No. 08/880,063 entitled High Density Nonwoven Filter Media and filed in the U.S. Patent and Trademark Office on Jun. 20, 1997 now U.S. Pat. No. 5,855,784; which is a continuation of application Ser. No. 08/425,539 filed Apr. 20, 1995, now abandoned which is a continuation-in-part of application Ser. No. 08/332,292 filed Oct. 31, 1994 now abandoned. The entirety of each of the aforesaid applications are hereby incorporated by reference.

BACKGROUND OF THE INVENTION

The present invention is related to a nonwoven web produced from conjugate fibers. More specifically, the invention is related to a filter medium of a conjugate fiber nonwoven web.

Porous nonwoven sheet media, such as composites containing meltblown or solution sprayed microfiber webs and conventional spunbond nonwoven webs have been used in various filtration applications, e.g., coolant filtration, cutting fluid filtration, swimming pool filtration, transmission fluid filtration, room air filtration and automotive air filtration. In liquid filtration applications, especially for large volume filtration applications, e.g., coolant and cutting fluid filtration, contaminated liquid typically is pressure driven onto a horizontally placed filter medium. Consequently, the filter medium needs to be strong enough to withstand the weight of the liquid and the applied driving pressure. As such, liquid filter media need to provide high strength properties in addition to suitable levels of filter efficiency, capacity and durability.

In general, composite filter media are formed by laminating a layer of a microfiber web onto a highly porous supporting layer or between two highly porous supporting layers since the microfiber layer does not have sufficient physical strength to be self-supporting. Consequently, the production process for composite filter media requires not only different layer materials but also requires elaborate layer-forming and laminating steps, making the filter media costly. Although self-supporting single-layer microfiber filter media can be produced in order to avoid the complexity of forming composite filter media by increasing the thickness of the microfiber filter layer, the pressure drop across such thick microfiber filter media is unacceptably high, making the microfiber media unfit for filter applications, especially for high throughput filter applications. An additional disadvantage of existing microfiber filter media and laminate filter media containing microfiber webs is that they tend to exhibit weak physical properties. Consequently, these filter media are not particularly useful for large volume liquid filtration uses.

Other sheet filter media widely used in the industry are cellulosic fiber webs of thermomechanically or chemically processed pulp fibers. Cellulosic fiber media are, for example, commonly used in automotive oil and fuel filters and vacuum cleaner filters. However, cellulosic fiber filter media tend to have a limited filter efficiency and do not provide the high strength properties that are required for high pressure, large volume liquid filtration applications.

Yet another group of filter media that have been utilized in liquid filtration applications are calendered spunbonded nonwoven webs, especially polyester spunbond webs. For example, calendered polyester spunbond filter media are commercially available from Reemay, Inc. under the Reemay® trademark. Typically, spunbond filter media are formed by melt-spinning a physical blend of structural filaments and binder filaments, randomly and isotropically depositing the filaments onto a forming surface to form a nonwoven web, and then calendering the nonwoven web to activate the binder filaments to effect adhesive bonds, forming a sheet filter medium that has a relatively uniform thickness. These calendered sheet filter media exhibit good strength properties. However, the filter efficiency of these spunbond filter media is, in general, significantly lower than that of microfiber filter media. In addition, the porosity distribution on the surface of the calendered spunbond filter media tends to be non-uniform. This is because when the spun filaments are randomly deposited on the forming surface, the filament density, i.e., the number of filament strands deposited for a given area of surface, of the deposited web varies from one section to another; and when the deposited fiber web is calendered and compacted to a uniform fiber thickness, the sections of high fiber density and low fiber density form low porosity and high porosity sections, respectively. Consequently, the calendered spunbond filter media tend to have a non-uniform porosity distribution.

There remains a need for economical filter media that provide a highly desirable combination of high filtration efficiency, capacity and high physical strength.

SUMMARY OF THE INVENTION

The invention provides a sheet filter medium having autogenously bonded uncrimped conjugate fibers. The filter medium has a density between about 0.07 g/cm$^3$ and about 0.2 g/cm$^3$ and a Frazier permeability of at least 3.5 m$^3$/min/m$^2$ (50 ft$^3$/min/ft$^2$), and the conjugate fibers have a polyolefin and another thermoplastic polymer having a melting point higher than the polyolefin. The medium has a Mullen Burst strength of at least 3.5 kg/cm$^2$, and the medium is particularly suited for filtering liquid.

The invention also provides a three dimensionally thermoformed filter medium that has autogenously bonded uncrimped conjugate fibers selected from spunbond fibers and staple fibers containing a polyolefin and another thermoplastic polymer, wherein the polyolefin and the thermoplastic polymer have different differential scanning calorimetry melting curves such that an exposure to a temperature that melts about 50% of the lower melting polyolefin component melts equal to or less than about 10% of the other thermoplastic component. The thermoformed filter medium has a density between about 0.07 g/cm$^3$ and about 0.5 g/cm$^3$.

Conjugate fibers as used herein indicate fibers having at least two different component polymer compositions which occupy distinct cross sections along substantially the entire length of the fibers. The term "fibers" as used herein indicates both continuous filaments and discontinuous fibers, e.g., staple fibers. The term "spunbond fibers" refers to fibers formed by extruding molten thermoplastic polymers as continuous filaments from a plurality of relatively fine, usually circular, capillaries of a spinneret, and then rapidly drawing the extruded filaments by an eductive or other well-known drawing mechanism to impart molecular orientation and physical strength to the filaments. The drawn continuous filaments are deposited onto a foraminous forming surface in a highly random manner to form a nonwoven web having essentially a uniform density. A vacuum apparatus may be placed underneath the forming surface around the region where the fibers are deposited to facilitate an appropriate placement and distribution of the fibers. Then the deposited nonwoven web is bonded to impart physical integrity and strength. The processes for producing spunbond fibers and webs therefrom are disclosed, for example, in U.S. Pat. Nos. 4,340,563 to Appel et al.; 3,692,618 to Dorschner et al. and U.S. Pat. No. 3,802,817 to Matsuki et al. In accordance with the present invention, the filter medium desirably contains continuous conjugate filaments, e.g., spunbond conjugate fibers, since continuous filaments provide improved strength properties and do not tend to produce lint. The term "uncrimped" as used herein indicates fibers that have not been subjected to fiber crimping or texturizing processes and desirably have less than 2 crimps per extended inch as measured in accordance with ASTM D-3937-82. The term "uniform fiber coverage" as used herein indicates a uniform or substantially uniform fiber coverage that is achieved by random and isotropic fiber or filament depositing processes.

The nonwoven filter medium of the present invention is highly suitable for various filter applications that require high filter efficiency, physical strength, abrasion resistance, thermoformabililty and the like. Additionally, the nonwoven filter medium is highly suitable for converting it into a high pleat density filter medium.

DETAILED DESCRIPTION OF THE INVENTION

The present invention provides a nonwoven sheet filter medium of uncrimped or substantially uncrimped conjugate fibers. The filter medium is highly useful for liquid filtration. The filter medium has a density between about 0.07 g/cm$^3$ and about 0.2 g/cm$^3$, desirably between about 0.08 g/cm$^3$ and about 0.19 g/cm$^3$, more desirably between about 0.01 g/cm$^3$ and about 0.15 g/cm$^3$, and a permeability of at least about 15 m$^3$/min/m$^2$ (50 ft$^3$/min/ft$^2$), desirably between about 15 m$^3$/min/m$^2$ and about 90 m$^3$/min/m$^2$, more desirably between about 18 m$^3$/min/m$^2$ and about 76 m$^3$/min/m$^2$, most desirably between about 30 m$^3$/min/m$^2$ and about 60 m$^3$/min/m$^2$, as measured in accordance with Federal Test Method 5440, Standard No 191A. The conjugate fiber nonwoven filter medium is characterized as having a desirable combination of useful filter attributes including high density, high strength, smooth surface and relatively uniform porosity distribution. The desirable characteristics of the present filter medium are attributable to the unique approach in producing the sheet nonwoven filter medium. The filter medium of the present invention is through-air bonded, and not calender bonded, and yet the filter medium can be produced to have a low loft and high density that are comparable to calendered nonwoven filter media.

The conjugate fibers contain at least two component polymers that have different melting points, a higher melting polymer and a lower melting polymer, and the lower melting polymer occupies at least about 25%, desirably at least 40%, more desirably at least about 50%, of the total peripheral surface area along the length of the fibers such that the lower melting polymer can be heat activated to be rendered adhesive and forms autogenous interfiber bonds, while the higher melting polymer retains the structural integrity of the fibers. The present filter medium containing the conjugate fibers that form autogenous interfiber bonds exhibits high strength properties, especially multidirectional strength. Such multidirectional strength can be measured with the ASTM D3786-87 test, Mullen Burst test. The filter medium has a Mullen Burst strength of at least 3.5 kg/cm$^2$, desirably at least 4 kg/cm$^2$, more desirably at least 4.5 kg/cm$^2$.

Figure 1:
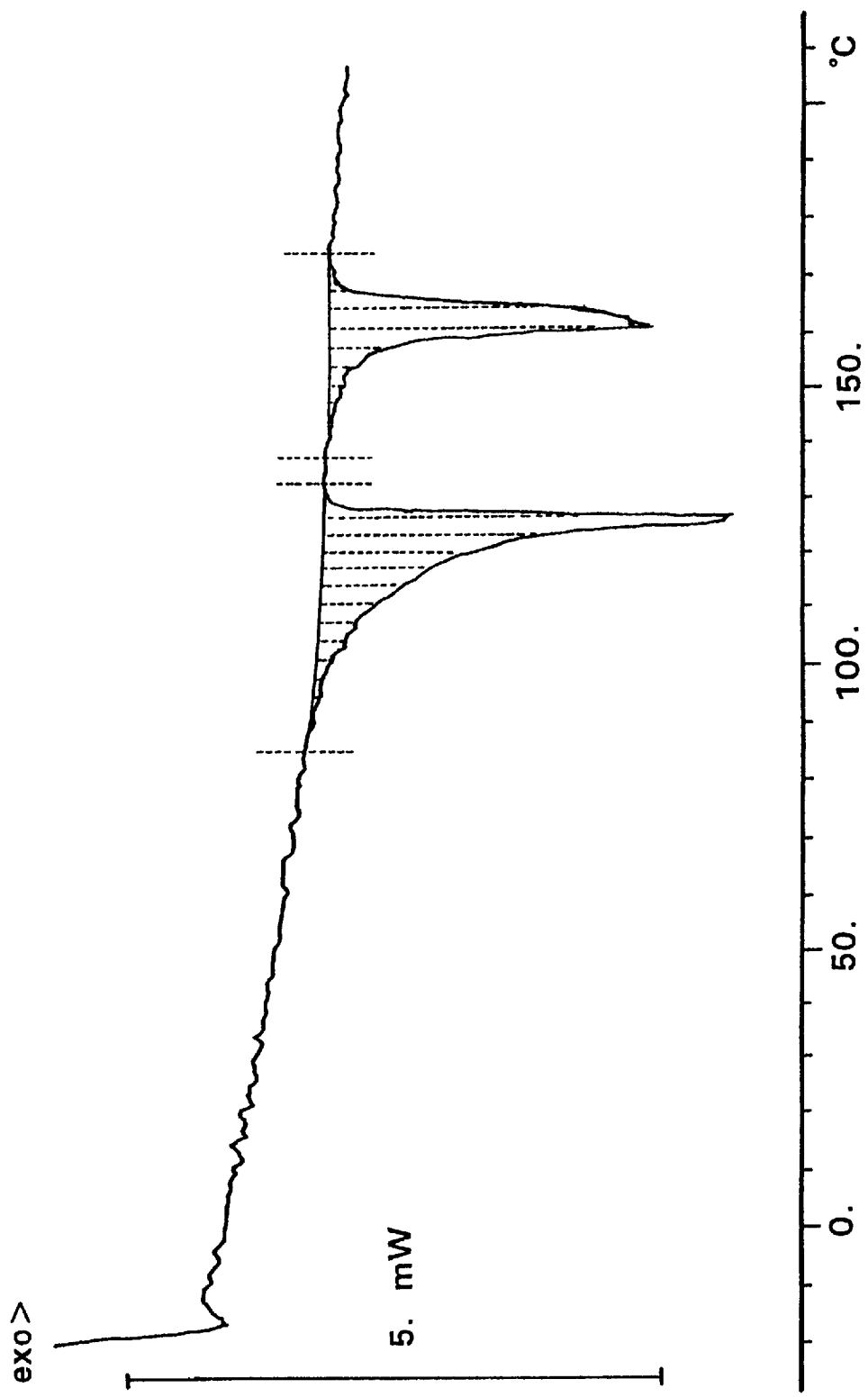
FIG. 1 is DSC melting curves for linear low density polyethylene and polypropylene.
Figure 2:
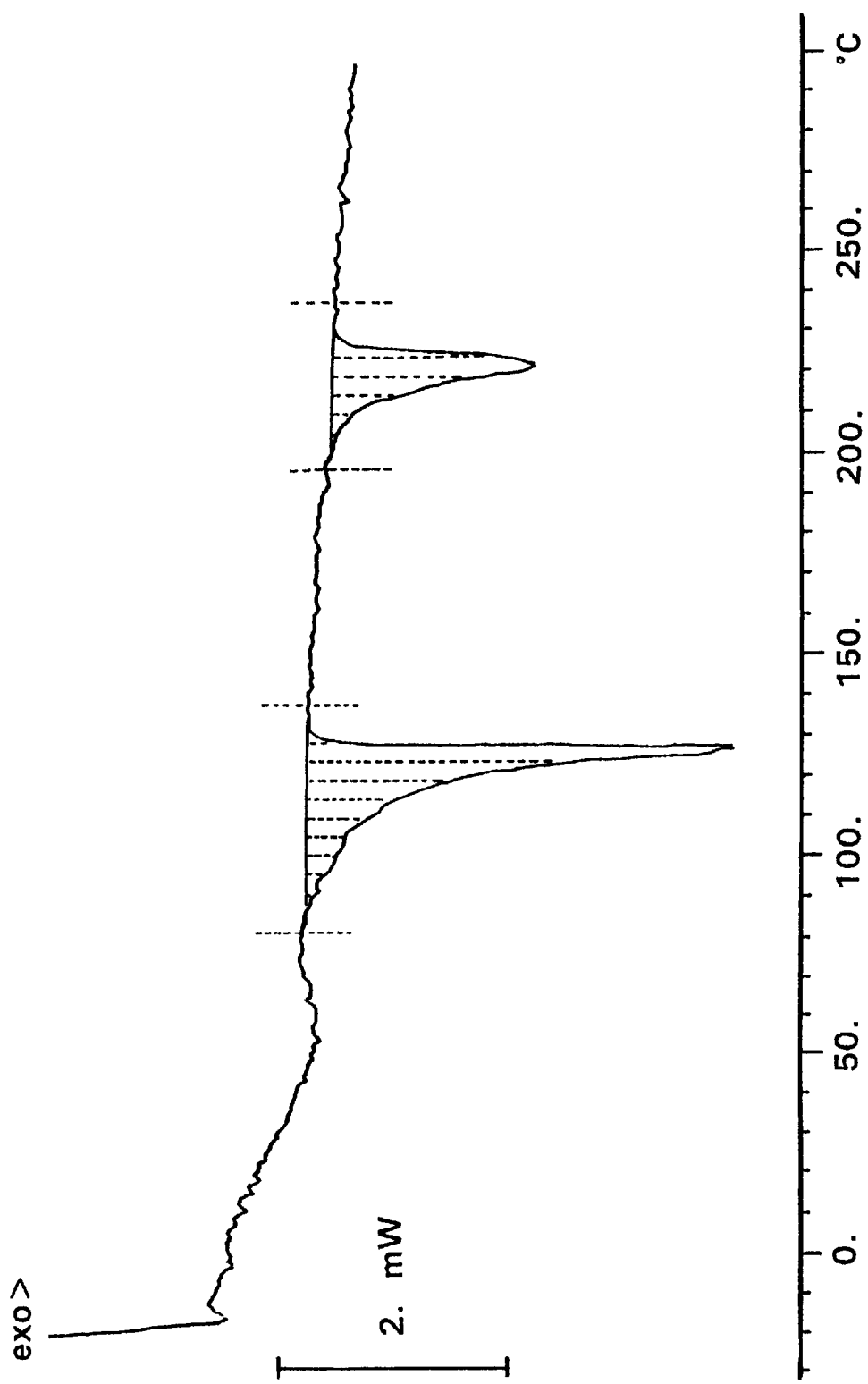
FIG. 2 is DSC melting curves for linear low density polyethylene and nylon 6.

Although the present conjugate fibers may contain more than two component polymers, the present invention is hereinafter illustrated with conjugate fibers having two-component polymers (bicomponent fibers). The component polymers are selected from fiber-forming thermoplastic polymers, and the polymers have a melting point difference of at least about 5° C., desirably at least about 10° C. Since thermoplastic polymers generally do not melt at a specific temperature, but instead melt over a span of temperature, the melting temperature difference between the lower melting polymer component and the higher melting component polymer can be better defined by the melting curve measurements in a conventional differential scanning calorimetry (DSC). Even if two polymers may have significantly different melting points, which is generally defined as the peak of the DSC melting curve, the polymers may melt simultaneously over a range of temperatures due to overlap of the melting curve temperature ranges. In accordance with the present invention, the component polymers are selected so that at the temperature where 50% of the lower melting polymer is melted, as defined by the DSC melting curve of the polymer, the higher melting polymer melts equal to or less than 10%, desirably equal to or less than 5%. More desirably, the DSC melting curves of the component polymers do not overlap at all; and most desirably, the DSC melting curves of the component polymers are separated by at least some degree. The component polymers selected in accordance with the melting point selection criterion of the present invention provide a beneficial combination of thermal and physical properties such that the lower melting component polymer can be thermally rendered adhesive while the other component polymers maintain the physical integrity of the fibers, thereby forming strong interfiber bonds without sacrificing the physical integrity of the nonwoven web or requiring compaction pressure. Moreover, when the DSC melting curves do not overlap, the difference in melting temperature ranges enables the nonwoven web to be heated even to a temperature at which the lower melting component polymer is melted and allowed to flow and spread within the fiber structure without loosing the structural integrity of the web. The flow of the lower melting polymer, in general, improves the abrasion resistance and strength and increases the density of the web, producing a more compacted filter medium. For example, linear low density polyethylene and polypropylene are highly suitable component polymers for the conjugate fibers since the DSC melting curves of the polymers do not overlap at all, as shown in FIG. 1. The first dip in the melting curve of FIG. 1 is the melting curve of linear low density polyethylene and the second dip is the melting curve of polypropylene. FIG. 2 is another example of a suitable polymer combination for the conjugate fibers. The DSC melting curves, as shown in FIG. 2, for linear low density polyethylene and nylon 6 are significantly separated. The first significant dip in the melting curve of FIG. 2 is the melting curve of linear low density polyethylene and the second dip is the melting curve of nylon 6. The melting curves show that the melting temperature ranges of the two polymers are significantly different, making the polymers highly suitable for the present invention.

In accordance with the present invention, the lower melting component polymer is selected from polyolefins, and the lower melting polymer constitutes between about 10 wt % and about 90 wt %, desirably between about 30 wt % and about 80 wt %, more desirably between about 40 wt % and about 70 wt %, of the fibers based on the total weight of the fibers. The polyolefin is selected from polyethylene, e.g., linear low density polyethylene, high density polyethylene, low density polyethylene and medium density polyethylene; polypropylene, e.g., isotactic polypropylene, syndiotactic polypropylene, blends thereof and blends of isotactic polypropylene and atactic polypropylene; polybutylene, e.g., poly(1-butene) and poly(2-butene); and polypentene, e.g., poly-4-methylpentene-1 and poly(2-pentene); as well as blends and copolymers thereof, e.g., ethylene-propylene copolymer, ethylene-butylene copolymer and the like.

The other component polymers for the conjugate fibers are selected from polyolefins, polyamides, polyesters, polycarbonate, and blends and copolymers thereof, as well as copolymers containing acrylic monomers, provided that the other component polymers are selected in accordance with the above-described melting point selection criterion. Suitable polyolefins include polyethylene, e.g., linear low density polyethylene, high density polyethylene, low density polyethylene and medium density polyethylene; polypropylene, e.g., isotactic polypropylene, syndiotactic polypropylene, blends thereof and blends of isotactic polypropylene and atactic polypropylene; polybutylene, e.g., poly(1-butene) and poly(2-butene); and polypentene, e.g., poly-4-methylpentene-1 and poly(2-pentene); as well as blends and copolymers thereof. Suitable polyamides include nylon 6, nylon 6/6, nylon 10, nylon 4/6, nylon 10/10, nylon 12, nylon 6/12, nylon 12/12, and hydrophilic polyamide copolymers, such as copolymers of caprolactam and an alkylene oxide diamine and copolymers of hexamethylene adipamide and an alkylene oxide, as well as blends and copolymers thereof. Suitable polyesters include polyethylene terephthalate, polybutylene terephthalate, polycyclohexylenedimethylene terephthalate, and blends and copolymers thereof. Acrylic copolymers suitable for the present invention include ethylene acrylic acid, ethylene methacrylic acid, ethylene methylacrylate, ethylene ethylacrylate, ethylene butylacrylate and blends thereof. Among various combinations of the above illustrated suitable component polymers, because of the economical availability and desirable physical properties, particularly suitable conjugate fibers contain a combination of different polyolefins having the above-discussed melting point differential. More particularly suitable conjugate fibers are bicomponent polyolefin conjugate fibers having a polyethylene component, e.g., high density polyethylene, linear low density polyethylene and blends thereof, and a polypropylene component, e.g., isotactic propylene, syndiotactic propylene and blends thereof.

Suitable conjugate fiber configurations include concentric sheath-core, eccentric sheath-core, island-in-sea and side-by-side configurations. Particularly suitable for the present invention are conjugate fibers having symmetrically arranged component polymers, e.g., concentric sheath-core conjugate fibers, since fibers having a symmetric polymer arrangement do not possess potential or latent crimpability. In general, asymmetric conjugate fibers, such as side-by-side conjugate fibers, that contain component polymers having different crystallization and/or shrinkage properties possess latent crimpability, which can be thermally or mechanically activated. It is believed that the latent crimpability is imparted in the conjugate fibers because of the shrinkage disparity of the component polymers. When such conjugate fibers are exposed to a heat treatment or a drawing process, the shrinkage disparity among the component polymers of the conjugate fibers during the heat treatment or drawing process causes the fibers to crimp. As such, when fibers having an eccentric sheath-core or a side-by-side configuration are used, the fibers may need to be processed in such a manner as to prevent the fibers from possessing or activating latent crimpability. For example, U.S. Pat. No. 4,315,881 to Nakajima et al. discloses a process for producing polyethylene-polypropylene side-by-side staple conjugate fibers that do not have crimps and latent crimpability, which patent is herein incorporated by reference. The process employs a specific stretching ratio and temperature to obtain conjugate fibers having no crimp and latent crimpability. As for spunbond conjugate fibers, the production process for the fibers can adjusted to prevent crimps and latent crimpability. For example, conjugate fibers having polypropylene and polyethylene can be drawn with a high drawing stress during the spunbond fiber forming process, e.g., by providing a low polymer throughput rate and increasing the fiber drawing force, to produce conjugate fibers that do not have crimps and latent crimpability.

Figure 3:
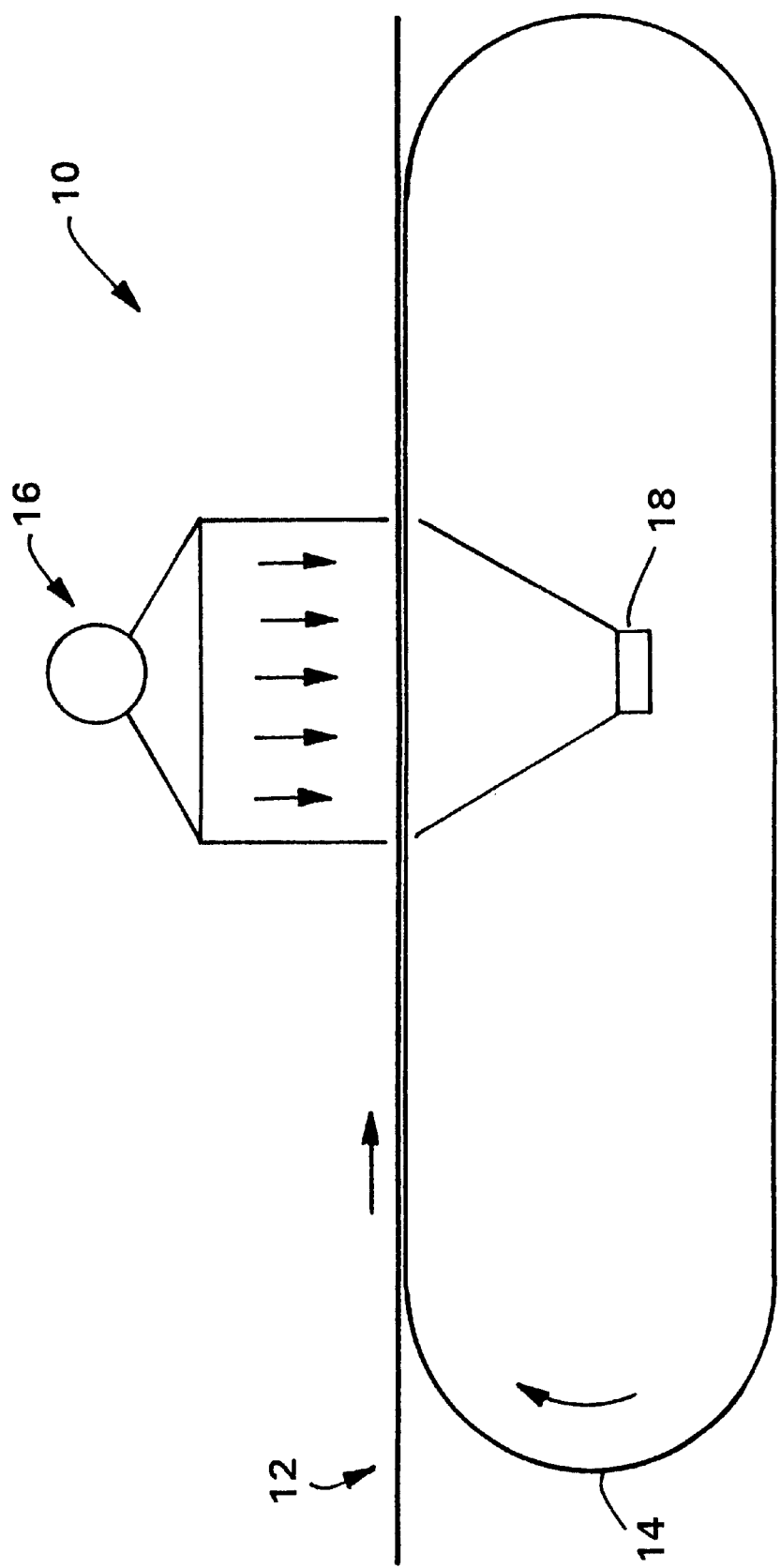
FIG. 3 illustrates a through-air bonder which is suitable for the present invention.

A nonwoven web suitable for the present invention, which has a relatively uniform fiber coverage, can be formed by isotropically depositing the uncrimped conjugate fibers onto a forming surface. The deposited, unbonded nonwoven web of conjugate fibers is carried on a foraminous support surface and then bonded in a through-air bonder. FIG. 3 illustrates an exemplary through-air bonder 10 that is suitable for the present invention. The bonder 10 receives an unbonded nonwoven web 12 on a foraminous supporting surface 14. The through-air bonder 10 is equipped with a temperature adjustable heated air source 16 that heats air and directs the heated air toward the nonwoven web 12, and a vacuum apparatus 18 that is placed below the supporting surface 14 and directly underneath the heated air source 16. The vacuum apparatus 18 facilitates the heated air to travel through the nonwoven web 12. Unlike a conventional or hot air oven, or a radiant heater, which applies heat only on the surface of the nonwoven and relies on the web thermal conductivity to heat the interior of the web, a through-air bonder forces heated air through the nonwoven web to quickly and evenly raise the temperature of the web to a desired level. Although the flow rate of the heated air may be varied to accommodate the caliper and fiber density of each nonwoven web, a velocity from about 100 feet per minute to about 500 feet per minute is highly desirable. The temperature of the heated air and the dwell time of the nonwoven web in the bonder are adjusted to heat the web to a temperature that is higher than the melting temperature, i.e., the peak melting temperature determined with a DSC, of the low melting polyolefin component but lower than the melting point of the highest melting component polymer of the conjugate fibers. Desirably, the bonder heats the web to a temperature that is high enough to melt at least about 50% of the olefin component polymer but not as high as to melt more than 10% of the highest melting component polymer, as defined by the DSC melting curves. More desirably, the bonder heats the web to a temperature that completely melts the low melting polyolefin component but that melts less than about 10% of the highest melting component polymer, as defined by the DSC melting curve of the highest melting component polymer of the conjugate fibers. For example, when a nonwoven web of bicomponent conjugate fibers having polypropylene and linear low density polyethylene is used, the through-air bonder desirably applies a flow of heated air that has a temperature between about 260° F. and about 300° F., and the dwell time of the web in the bonder is desirably between about 0.1 seconds and about 6 seconds. It is to be noted that a short dwell time in the bonder is highly desirable since any latent crimpability that may be imparted during the fiber forming process, in general, does not manifest if the bonding duration is brief. In addition, the flow rate of the heated air can be adjusted to control the caliper and porosity of the nonwoven web. Generally, a higher flow rate produces a bonded web having a lower caliper and a lower porosity.

Unlike conventional calender bonded sheet nonwoven webs that have non-uniform porosity and pore size distributions, as discussed above, the present through-air bonded filter medium provides highly improved porosity and pore size distribution and the medium does not contain mechanically compacted regions that impede the filtration function of the medium. In addition, unlike a calender bonding process that applies mechanical compaction pressure and non-uniformly alters the pore size and pore configuration of different sections of the nonwoven web, depending on the caliper of different sections of the unbonded web, the through-air bonding process in conjunction with the uncrimped and uncrimping nature of the present conjugate fibers allow the nonwoven web to be bonded without imparting significant non-uniform changes in the pore size and configuration of the nonwoven web.

One additional advantage of the present nonwoven filter medium is that the porosity and density of the filter medium can be controlled not only with conventionally known approaches, e.g., varying the basis weight of the filter medium and varying the thickness of the conjugate fibers, but also during the bonding process. The polymer selection criteria, especially the melting point criterion, of the present invention provides an additional approach that can be conveniently utilized to control the porosity and density of the filter medium. As discussed above, because of the melting point difference between the low melting and high melting component polymers of the conjugate fibers, the nonwoven web produced from the fibers can be exposed to a temperature that is not only high enough to melt the low melting component polymer but also sufficiently high enough to allow the melt viscosity of the melted polymer to be lowered such that the melted polymer spreads while preserving the physical integrity of the higher melting component polymer and of the nonwoven web. In general, a bonding temperature that is measurably higher than the temperature at which the low melting polyolefin component completely melts facilitates and induces the melted polyolefin to spread, thereby reducing the porosity and increasing the density of the nonwoven web. It is to be noted that the present high density filter medium has a low caliper and high abrasion resistance that are highly suitable for processing the medium into a highly pleated filter medium.

As an additional embodiment of the present invention, the porosity and density of the nonwoven filter medium can also be controlled by varying the level of the low melting polyolefin content of the conjugate fibers. Generally, conjugate fibers having a higher level of the low melting polyolefin content form a nonwoven filter medium that has a lower porosity, higher density and higher abrasion resistance. In addition, the porosity and caliper of the nonwoven filter medium can be controlled during the bonding process by adjusting the flow rate of the heated air. Generally, a higher heated air flow rate produces a bonded filter medium having a lower caliper and a lower porosity.

The present filter medium is heretofore illustrated with a single layer medium. However, the filter medium can have more than one layer. For example, conjugate fiber filter media of the present invention that have different fiber thicknesses and/or densities can be laminated or sequentially deposited and then bonded to form a filter having a porosity gradient. Additionally, the conjugate fiber filter medium can be laminated to a microfiber filter media.

Although the filter medium is illustrated in conjunction with liquid filtration applications, the medium is also highly suitable for gas filtration applications. Moreover, for gas filtration applications, the density of the filter medium can be even higher in order to increase the efficiency of the filter medium. Even though the throughput capacity of such a high density filter medium is low, the throughput of the medium can be accommodated by three-dimensionally forming or pleating the filter medium since, as discussed above, the filter medium is highly thermoformable. The pleated filter medium has an increased effective filtration surface area and thus has an increased throughput rate. Consequently, the filter medium for gas filtration may have a density up to about 0.5 g/cm$^3$, desirably between about 0.1 g/cm$^3$ and about 0.5 g/cm$^3$, more desirably between about 0.11 g/cm$^3$ and about 0.45 g/cm$^3$, most desirably between about 0.12 g/cm$^3$ and about 0.4 g/cm$^3$.

Figure 4:
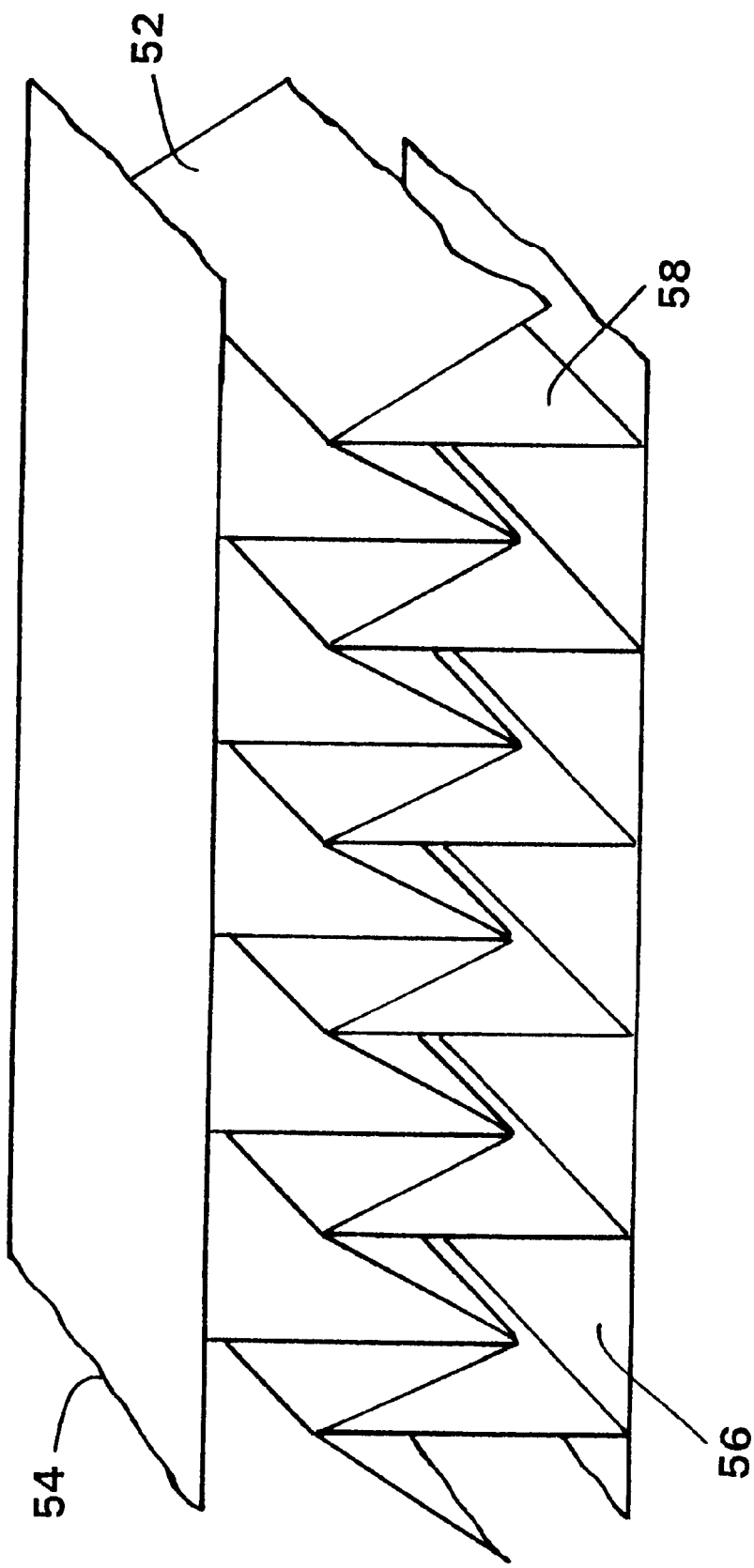
FIG. 4 illustrates a suitable pleating process.

The filter media of the nonwoven web of the present invention can be easily thermoformed into three dimensional shapes without measurably changing the porosity and physical properties of the media. The conjugate fiber nonwoven web for the present filter media can be thermoformed immediately after the web is through-air bonded but before the web is cooled since the bonded web that exits the through-air bonder is highly pliable. Consequently, the unquenched web can be managed into desired shapes before the web is cooled to retain the applied shape. For example, the unquenched web can be pleated using a known pleating process. FIG. 4 illustrates an example of suitable pleating processes. The web 52 can be passed through a set of intermeshing pleating plates or pressed between two intermeshing pleating plates, 54 and 56, that have equally spaced, perpendicularly attached equal length shims 58; and then cooled to solidify the low melting polyolefin polymer while the web is retained in the pleating plates to permanently set the pleat configuration into the nonwoven web.

The conjugate fiber filter medium is self-supporting, highly abrasion resistant filter media that have high filter efficiency and desirable strength properties. As such, the present filter medium is highly suitable for large volume liquid filtration applications. The filter medium can be used as a roll filter medium, which is continuously supplied to a filtering device, e.g., a flat bed filter, or as a sheet filter medium. The filter medium can also be fitted in a filter frame.

The filter media can also be conveniently electrostatically treated to form electret filter media and are highly thermoformable without sacrificing the physical and electret properties of the media. Consequently, the nonwoven filter medium are highly suitable for forming three dimensional filter media in a conventional thermoforming apparatus and for forming high pleat density filter media. The three dimensional thermoformed filter media, which are firm and self-supporting, can easily be fitted into a conventional filter frame or housing in a conventional manner. The filter media are highly suitable for various filtration applications. More particularly, the filter media are highly useful for liquid and gas filtration applications including water filters, oil filters, various gas filters and the like; and the electrostatically treated filter media are particularly suitable for gas filtration applications including industrial air cleaner filters, HVAC filters, automotive air filters, vacuum cleaner filters, and the like.

The following examples are provided for illustration purposes and the invention is not limited thereto.

EXAMPLES

The following test procedures were utilized to determine various properties of the filter media.

Filter Efficiency Test

The efficiency and service life of the filter samples were tested as follows. The filter testing apparatus had a 90 mm diameter filter holder assembly, which has an inlet and an outlet and directs the influent fluid entering from the inlet to pass through the sample filter medium, a gear pump and flow meter/regulator unit, which supplies the influent fluid to the filter holder assembly and is capable of maintaining 2 gallons per minute per square inch flow rate (1.2 liter/min/cm$^2$), and a pressure gauge, which is placed on the inlet side of the filter holder assembly. Samples of filter media were prepared by cutting filter webs to fit a 90 mm diameter filter holder. Each filter medium was weighed and fitted in the filter holder assembly. A test fluid, which contains 40 ml of QP 24 soap/oil emulsion and 1200 ml of deionized water, was placed in a beaker and then 1 g of an AC fine test particles was added to the test fluid. The test particles had the following particle size distributions:

| Size (less than) | Volume % |
|---|---|
| 5.5 µm | 38 |
| 11 µm | 54 |
| 22 µm | 71 |
| 44 µm | 89 |
| 176 µm | 100. |

The test fluid was continuously stirred with a magnetic stirrer and maintained at 38° C. The inlet of the pump was placed in the beaker, and the testing fluid was pumped through the sample filter and then returned to the beaker, forming a continuous loop, at a flow rate of 800 ml/min. The initial pressure and time were noted. The flow regulator was constantly adjusted to maintain a constant flow rate as the test particle accumulated on the test filter medium and the inlet pressure increased. 1 g of the test particles was added to the beaker at an interval of 5 minutes until the inlet pressure reached 30 psi (2.1 kg/cm$^2$), at which time the filter medium was considered plugged.

The plugged time was noted and the filter medium was removed. The removed filter medium was weighed to determine the amount of the test particles captured after completely drying it in an oven set at 180° F. The efficiency of the filter medium was determined by dividing the weight of the captured test particles by the weight of the total test particles added to the beaker. This efficiency test determines the overall efficiency of the filter medium over its entire service-life.

Initial Filter Efficiency

The initial filter efficiency measures the filter efficiency of sample filter media before a significant amount of the test particles is accumulated on the media, thereby measuring the inherent filter efficiency of the media. For this efficiency test, the above-described efficiency testing procedure was repeated, except the testing setup was changed to an open-loop system. 1240 ml of the above-described test fluid, which contained 40 ml of QP 24 soap/oil emulsion, 1200 ml of deionized water and 1 g of the AC fine test particles, was passed through the test filter, and then the filter efficiency was measured.

Frazier Permeability

The Frazier permeability, which expresses the permeability of a fabric in terms of cubic feet per minute of air per square foot of medium at a pressure drop of 0.5 inch (1.27 cm) of water, was determined utilizing a Frazier Air Permeability Tester available from the Frazier Precision Instrument Company and measured in accordance with Federal Test Method 5450, Standard No. 191A.

Density

The density of each filter medium was calculated from the basis weight and the caliper, which was measured at 0.5 psi (35 g/cm$^2$) with a Starret-type bulk tester.

Mullen Burst

This test measures the strength of a medium against a multidimensional stretching force. The test was conducted in accordance with ASTM D3786-87.

Example 1 (EX1)

A low loft nonwoven web was produced from linear low density polyethylene sheath—polypropylene core spunbond bicomponent conjugate fibers using two single screw extruders and a sheath-core spinning pack. The bicomponent fiber contained 20 wt % linear low density polyethylene (LLDPE) and 80 wt % polypropylene. LLDPE, Aspun 6811A, which is available from Dow Chemical, was blended with 2 wt % of a TiO$_2$ concentrate containing 50 wt % of TiO$_2$ and 50 wt % of polypropylene, and the mixture was fed into a first single screw extruder. Polypropylene, PD3443, which is available from Exxon, was blended with 2 wt % of the above-described TiO$_2$ concentrate, and the mixture was fed into a second single screw extruder. Using a bicomponent spinning die, which had a 0.6 mm spinhole diameter and a 6:1 L/D ratio, the extruded polymers were spun into round bicomponent fibers having a concentric sheath-core configuration. The temperatures of the molten polymers fed into the spinning die were kept at 450° F. (232° C.), and the spinhole throughput rate was 0.5 gram/hole/minute. The bicomponent fibers exiting the spinning die were quenched by a flow of air having a flow of air having a flow rate of 45 ft$^3$/min/inch spinneret width (0.5 m$^3$/min/cm) and a temperature of 65° F. (18° C.). The fibers entering the aspirator were drawn with the feed air at a flow rate of about 19 ft$^3$/minute/inch width (0.21 m$^3$/min/cm). The weight-per-unit-length measurement of the drawn fibers was about 2.5 denier per filament. The drawn fibers were then deposited on a foraminous forming surface with the assist of a vacuum flow to form a first unbonded fiber web. An identical bicomponent fiber spinning unit was consecutively positioned next to the first fiber spinning unit and deposited the drawn fibers on top of the first unbonded fiber web, forming a unitary nonwoven web.

The unbonded fiber web was bonded by passing the web on a foraminous supporting surface through a through-air bonder that applied a flow of heated air at a temperature of 280° F. (138° C.) and a velocity of 500 feet/min (152 m/min). The residence time in the bonder was about 2 seconds. The resulting nonwoven web had a 3 osy (102 g/m²) basis weight and had a uniformly bonded sheet-like configuration. The nonwoven filter medium was tested for various properties as shown in Table 1.

Example 2 (Ex2)

A low loft nonwoven web was produced from LLDPE sheath—polypropylene core spunbond bicomponent conjugate fibers in accordance Example 1, except the weight ratio of LLDPE:polypropylene was 50:50. The test results are shown in Table 1.

Example 3 (Ex3)

A low loft nonwoven web was produced from side-by-side bicomponent conjugate fibers of LLDPE and polypropylene having a 50:50 weight ratio. The production procedure outlined in Example 1 was repeated, except a side-by-side spinning die was used to produce conjugate fibers having a side-by-side configuration. The feed air flow rate was increased to prevent the fibers from having crimps and latent crimpability, and the flow rate was about 0.22 m³/minute/cm width. The results are shown in Table 1.

Example 4 (Ex4)

A low loft nonwoven web of polypropylene sheath—nylon 6 core was produced in accordance with the procedure outlined in Example 1, except the bonding air temperature was 149°0 C. The weight ratio between polypropylene and nylon 6 was 90:10. The nylon was obtained from Custom Resin and had a sulfuric acid viscosity of 2.2. The results are shown in Table 1.

Example 5 (Ex5)

A high density filter medium of LLDPE-sheath/nylon 6-core spunbond fibers was prepared in accordance with Example 4, except the weight ratio between LLDPE and nylon 6 was 80:20. Example 5 is a comparative example for the purpose of the present sheet filter illustration although the filter medium is highly suitable for pleated filter applications. The results are shown in Table 1.

Example 6 (Ex6)

A high density filter medium of 80 wt % LLDPE/20 wt % polypropylene sheath/core spunbond fibers was prepared in accordance with Example 3. Example 6 is a comparative example for the purpose of the present sheet filter illustration although the filter medium is highly suitable for pleated filter applications. The results are shown in Table 1.

Comparative Example 1 (C1)

A crimped side-by-side spunbond conjugate fiber web was prepared by repeating the production procedure of Example 3, except the aspirating air used was heated to about 350° F. and had a flow rate of 23 ft³/min/in width. The unbonded fiber web was bonded by passing the webs through a through-air bonder having an air temperature of 272° F. and a air velocity of 200 feet/min. The results are shown in Table 1.

Comparative Example 2 (C2)

A point bonded polypropylene spunbond fiber web, which is commercially available from Kimberly-Clark under the tradename Accord™ and has a bonded area of about 25%, was tested for its initial filter efficiency. The results are shown in Table 1.

Comparative Examples 3–6 (C3–C6)

Comparative Examples 3 and 4 were Reemay™ filters, style numbers 2033 and 2440, respectively. Reemay™ filters are calender bonded webs of polyethylene terephthalate polyester spunbond fibers and copolyester spunbond fibers. Comparative Example 5 was Typar 3301, which is a polypropylene spunbond nonwoven web. Reemay™ and Typar™ are commercially available from Reemay, Inc., old Hickory, Tenn.

Comparative Example 6 was a commercial liquid filter medium available from Auchenbach of Germany. The filter medium is calendered polyester spunbond nonwoven web that is spot bonded with an acrylic binder. The results are shown in Table 1.

Comparative Example 7 (C7)

A unbonded three layers laminate of Reemay 2011 was tested for the initial filter efficiency. Reemay 2011 was selected since the density of the material is within the range of the present filter medium. The result is shown in Table 1.

TABLE 1

| Ex | Polymers | Wt Ratio (wt %) | B. Wt (g/m²) | Density (g/cc) | Denier | Frazier Perm | Efficiency Overall (%) | Efficiency Initial (%) | Life (min) | Mullen Burst |
|---|---|---|---|---|---|---|---|---|---|---|
| Ex1 | LLDPE:PP | 20:80 | 102 | 0.08 | 2.1 | 61 | 36 | 19 | 24.7 | 6.6 |
| Ex2 | LLDPE:PP | 50:50 | 102 | 0.11 | 2.5 | 54 | 31 | 23 | 12.8 | 5.4 |
| Ex3 | LLDPE:PP | 50:50 | 102 | 0.12 | 2.5 | 61 | 37 | 19 | 13.9 | 4.8 |
| Ex4 | PP:N6 | 90:10 | 108 | 0.19 | 2.5 | 19 | 38 | 32 | 2.3 | — |
| Ex5 | LLDPE:N6 | 80:20 | 102 | 0.37 | 2.5 | 13 | 24 | 49 | 0.8 | — |
| Ex6 | LLDPE:PP | 80:20 | 98 | 0.29 | 2.5 | 22 | 34 | 28 | 1.5 | — |
| C1 | LLDPE:PP | 50:50 | 102 | 0.05 | 2.5 | 97 | 33 | 14 | 90 | 2.7 |
| C2 | PP | — | 102 | 0.15 | — | 21 | — | 20 | — | 7.0 |
| C3 | Polyester | — | 98 | 0.26 | 4 | 76 | 23 | 12 | 5.9 | 5.9 |
| C4 | Polyester | — | 98 | 0.18 | 4 | 107 | 28 | 5 | 41.8 | 2.7 |
| C5 | PP | — | 102 | 0.33 | 10 | 46 | 20 | 2 | 38.5 | 6.5 |
| C6 | Polyester | — | 85 | 0.37 | — | 44 | 19 | 10 | 1.1 | 11.2 |
| C7 | Polyester | — | 78 | 0.14 | 4 | — | — | 5 | — | — |

TABLE 1-continued

| Ex | Polymers | Wt Ratio (wt %) | B. Wt (g/m²) | Density (g/cc) | Denier | Frazier Perm | Efficiency Overall (%) | Initial (%) | Life (min) | Mullen Burst |
|---|---|---|---|---|---|---|---|---|---|---|

Note:
B. Wt = basis weight (g/m²)
Frazier Prem = Frazier permeability (m³/minute/m²)
Mullen Burst in Kg/cm²

The results clearly indicate that the filter media of the present invention exhibit a highly desirable combination of good filter efficiency, filter life and strength properties, especially for liquid filtration. Compared to the prior art polyester and polypropylene spunbond filter media, the conjugate fiber filter media of the present invention have a combination of highly improved overall and initial efficiencies, and filter life, as well as provide high strength properties.

In addition, the examples of the present filter media also demonstrate that the physical properties, e.g., density, permeability and strength, of the filter media can easily be modified by changing various elements of the filter media manufacturing process. For example, by changing the weight ratio of the component polymers, changing the component polymers and/or changing the bonding conditions, the filter media can be produced to have different physical and filtration properties.

Figure 5:
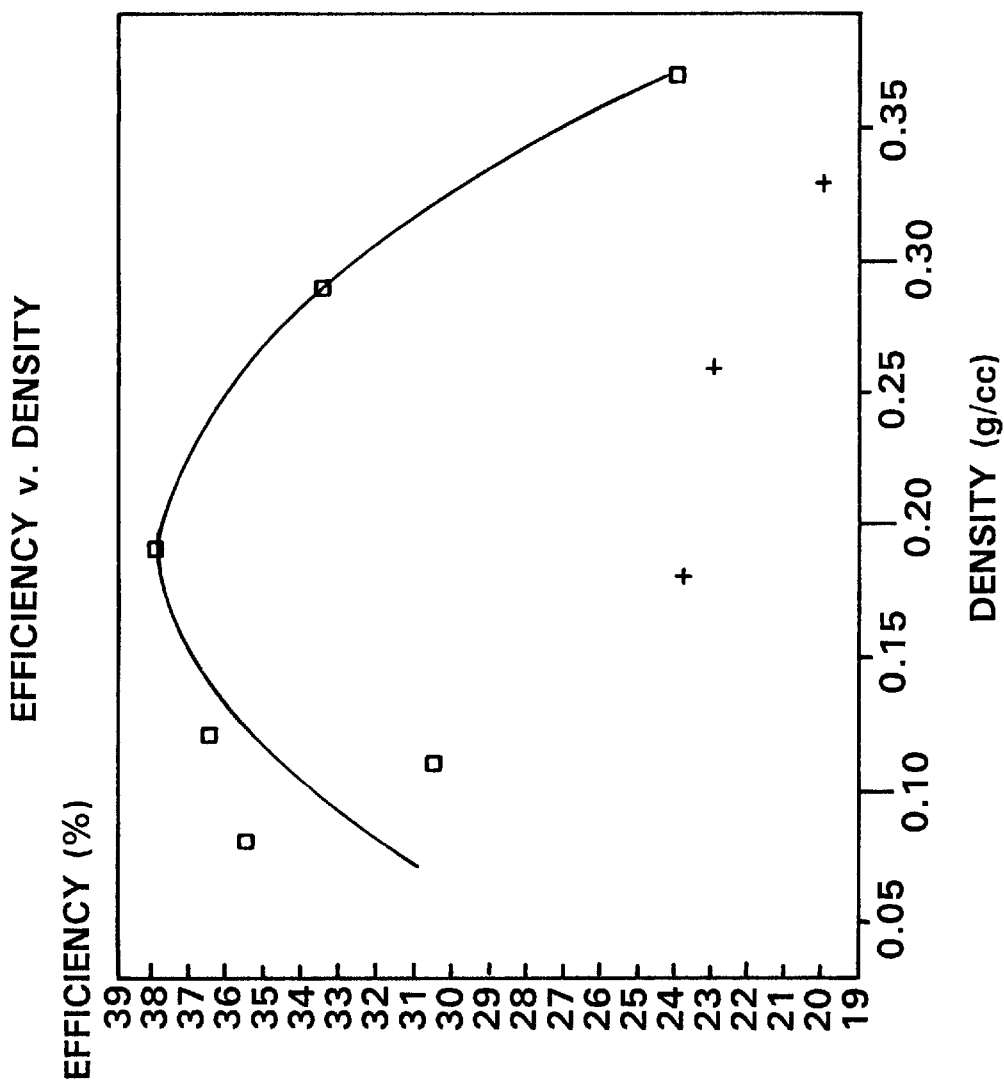
FIG. 5 is a graph of the filter efficiencies of various filter media with respect to their densities.
Figure 6:
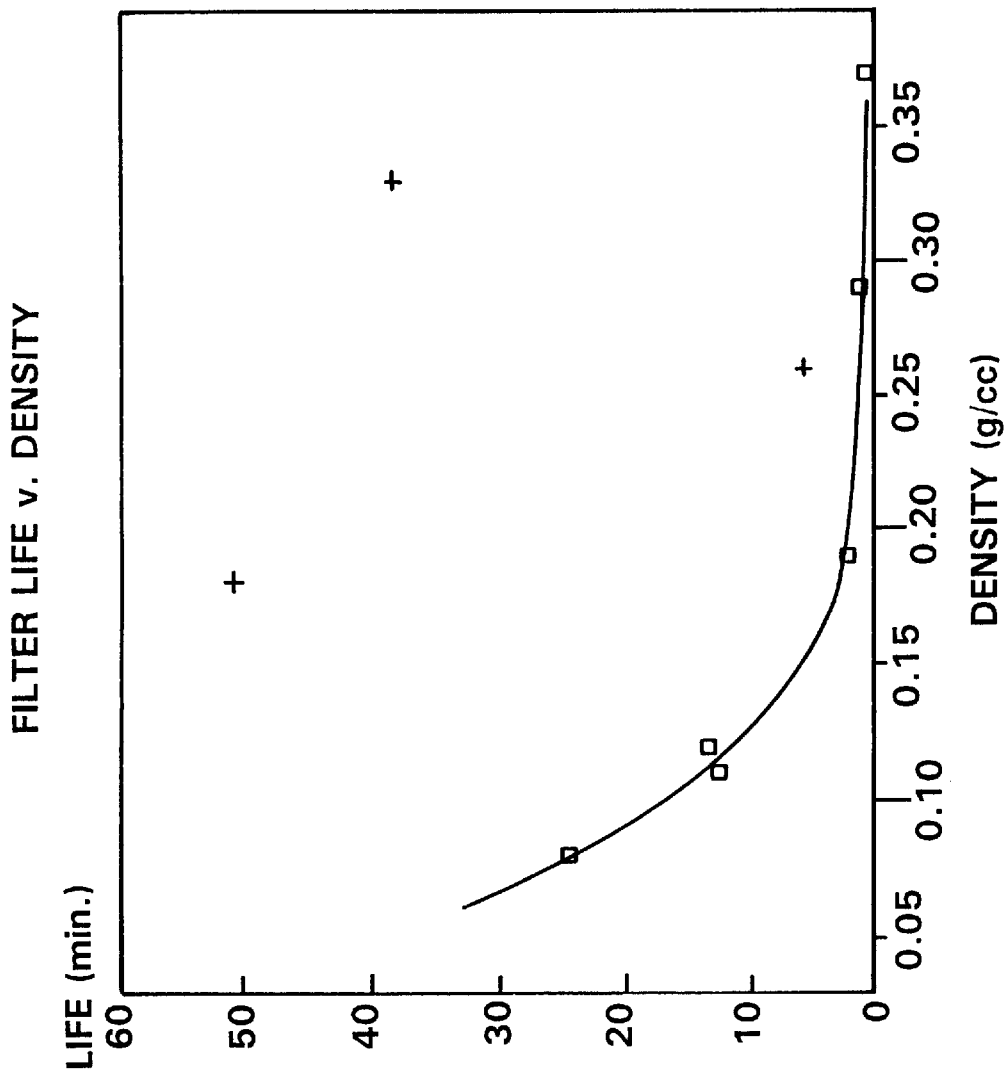
FIG. 6 is a graph of the filter lives of various filter media with respect to their densities.
Figure 7:
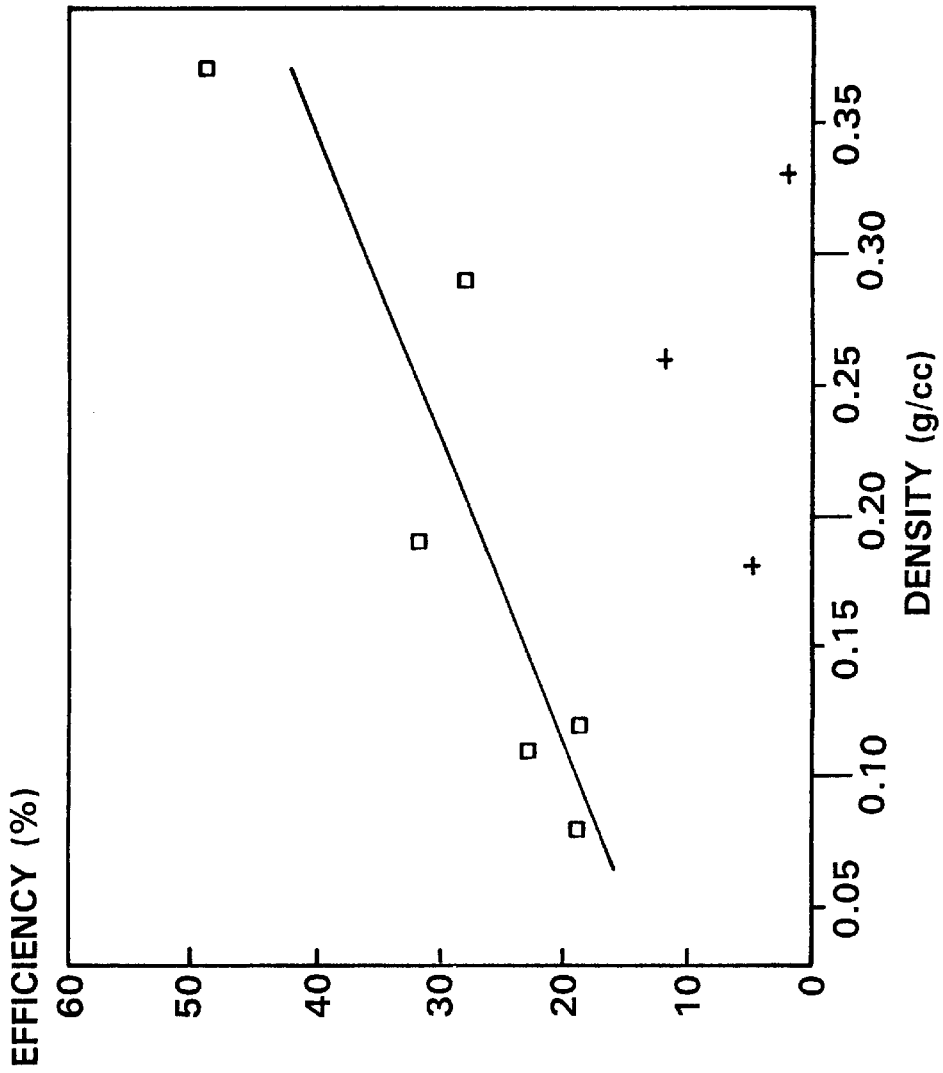
FIG. 7 is a graph of the initial filter efficiencies of various filter media with respect to their densities.

In order to more clearly demonstrate the highly useful combination of efficiency and life of the present filter media, the filter efficiency data and the filter life data for Examples 1–6 and Comparative Examples 3–5 were graphically plotted, since the examples have a similar basis weight and thus should be directly comparable. FIG. 5 illustrates the filter efficiencies with respect to the densities of the example filter media; FIG. 6 illustrates the filter life with respect to the densities of the filter media; and FIG. 7 illustrates the initial filter efficiencies of the example filter media.

FIG. 5 illustrates that the filter efficiencies of the present filter media are significantly better than the commercial polyester filter media; FIG. 6 shows that the present filter media have a long service life; and FIG. 7 shows that the present filter media have a highly improved initial filter efficiency. It is to be noted that although the filter life of the commercial polyester filter media may appear to be beneficial from FIG. 6, FIG. 5 and FIG. 7 clearly demonstrates that the extended life of these filter media are the result of poor filter efficiency. Alternatively stated, these commercial filter media allow a large portion of the contaminant particles to pass through the media and, thus, lessening the contaminant cake build up on the filter surface, extending the service-life while providing a poor filter efficiency.

From FIGS. 5 and 6, it can be seen that, for liquid filtration applications, the present filter media provide an especially desirable combination of filter efficiency and life when the media have a density between about 0.07 g/cm³ and about 0.2 g/cm³.

As can be seem from the above, the through-air bonded conjugate fiber filter media of the present invention highly desirable filter attributes, such as filter efficiency, strength, life and the like. Accordingly, the filter media is highly useful for various filtration applications that require filter attributes including self-support, high efficiency, long filter life and strength.

What is claimed is:

1. A filter medium comprising:
   a first layer comprising a nonwoven web of autogenously bonded uncrimped multicomponent spunbond fibers having a density between about 0.07 g/cm³ and about 0.2 g/cm³ wherein said multicomponent spunbond fibers comprise at least a first thermoplastic polymer component and a second thermoplastic polymer component having a melting point difference of at least 5° C. and further wherein said fibers are bonded at fiber cross-over points; and
   a second layer laminated to said first layer, said second layer comprising a microfiber web.

2. The filter medium of claim 1 wherein said microfiber web comprises a nonwoven web of meltblown fibers.

3. The filter medium of claim 2 wherein the first thermoplastic polymer component of said multicomponent spunbond fibers comprises a polymer having a melting point at least about 10° C. lower than the melting point of the second thermoplastic polymer component.

4. The filter medium of claim 3 wherein said first thermoplastic polymer component comprises a polyolefin selected from the group consisting of polyethylene, polypropylene, polybutylene, polypentene, and blends and copolymers thereof.

5. The filter medium of claim 4 wherein said second thermoplastic polymer is selected from the group consisting of polyolefins, polycarbonate, polyamides, polyesters, acrylic copolymers, and blends and copolymers thereof.

6. The filter medium of claim 3 wherein said first thermoplastic polymer component comprises polyethylene and said second thermoplastic polymer component comprises polypropylene.

7. The filter medium of claim 6 wherein said first layer is electret treated.

8. The filter medium of claim 3 wherein first thermoplastic polymer component comprises polyethylene and said second thermoplastic polymer component comprises nylon 6.

9. The filter medium of claim 3 wherein said first thermoplastic polymer component comprises polyethylene and said second thermoplastic polymer component comprises polyethylene terephthalate.

10. The filter medium of claim 3 wherein said first layer is through-air bonded and is without mechanically compacted regions.

11. The filter medium of claim 10 wherein said first layer has a density greater than about 0.1 g/cm³ and less than about 0.15 g/cm³.

12. The filter medium of claim 10 wherein said medium has a Mullen Burst strength of at least about 3.5 kg/cm².

13. The filter medium of claim 10 wherein said multicomponent spunbond fibers are bicomponent fibers.

14. The filter medium of claim 10 wherein said medium is three dimensionally shaped.

15. The filter medium of claim 10 wherein said first layer is electret treated.

16. The filter medium of claim 1 further comprising a third layer, said third layer comprising an autogenously bonded nonwoven web of multicomponent spunbond fibers comprising at least a first thermoplastic polymer component and a second thermoplastic polymer component having a melting point difference of at least 10° C. and wherein said first layer is disposed between said second and third layers.

17. The filter medium of claim 16 wherein said first layer of multicomponent spunbond fibers is through-air bonded and is without mechanically compacted regions.

18. The filter medium of claim 17 wherein said third layer of multicomponent spunbond fibers is through-air bonded and is without mechanically compacted regions.

19. The filter medium of claim 17 wherein said first layer is electret treated.

20. The filter medium of claim 18 wherein said microfiber web comprises a nonwoven web of meltblown fibers.

21. The filter medium of claim 20 wherein the first thermoplastic polymer component of said multicomponent spunbond fibers of said first layer comprises a polymer having a melting point at least about 10° C. lower than the melting point of the second polymer component.

22. The filter medium of claim 21 wherein said first thermoplastic polymer component of each of said first and third layers comprise a polyethylene polymer and said second thermoplastic polymer component of each of said first and third layers comprise a polypropylene polymer.

23. The filter medium of claim 21 wherein the first thermoplastic polymer component of each of said first and third layers comprises a polyethylene polymer.

24. The filter medium of claim 23 wherein the second thermoplastic polymer of said first layer comprises a polypropylene polymer.

25. The filter medium of claim 23 said second thermoplastic polymer component of each of said first and third layers comprise nylon 6.

26. The filter medium of claim 23 wherein said second thermoplastic polymer of each of said first and third layers comprises polyethylene terephthelate.

27. The filter medium of claim 22 wherein said first layer has a density greater than about 0.1 g/cm$^3$ and less than about 0.15 g/cm$^3$ and wherein said first layer has a density greater than that of said third layer.

28. The filter medium of claim 27 wherein said first layer has a Mullen Burst strength of at least about 3.5 kg/cm$^2$.

29. The filter medium of claim 1 wherein said first layer is electret treated.

* * * * *